$$K_1 = \frac{P_{MAl_2Cl_8}}{P^2_{AlCl_3}} \; (mm^{-1})$$

INVENTOR.
ERNEST WILLIAM DEWING
BY
Robert S. Dunham
ATTORNEY

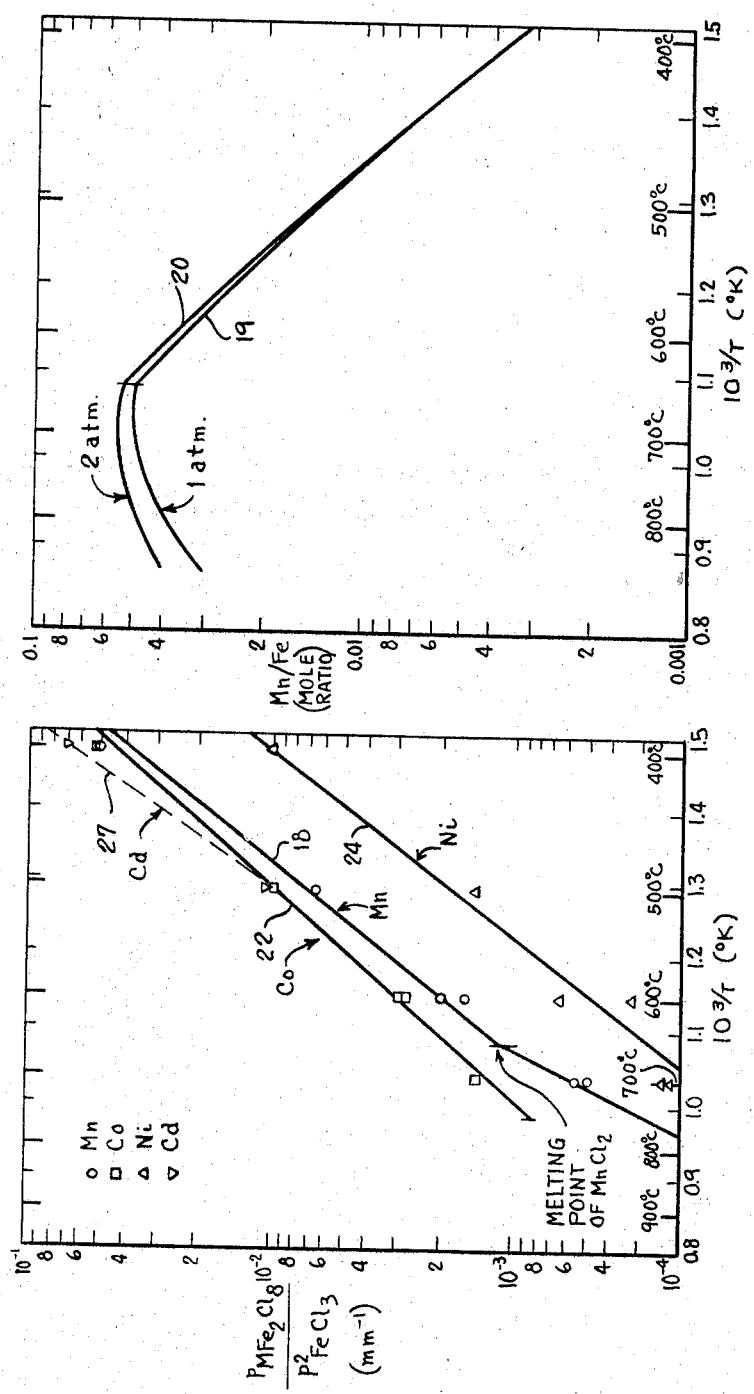

3,425,797
RECOVERY OF PURIFIED DIVALENT METAL CHLORIDES

Ernest William Dewing, Arvida, Quebec, Canada, assignor to Aluminium Laboratories Limited, Montreal, Quebec, Canada, a corporation of Canada
Filed Feb. 25, 1966, Ser. No. 530,193
U.S. Cl. 23—87          18 Claims
Int. Cl. C01f 11/24, 5/30, 7/58

---

ABSTRACT OF THE DISCLOSURE

In a method of recovering divalent metal chlorides, the steps of exposing a divalent metal chloride to gaseous aluminum or ferric chloride at a temperature of at least about 400° C. for converting the divalent chloride to gaseous material including at least one gaseous complex chloride formed by reaction of the divalent chloride with the trivalent chloride, and condensing the gaseous material for recovering the divalent chloride as a purified condensate, the condensing step effecting thermal decomposition of the gaseous complex chloride into the trivalent chloride and pure anhydrous divalent chloride. The gaseous complexes, which constitute intermediates in this method, have the formula $$M_xQ_yCl_{(2x+3y)}$$

wherein M is a divalent metal, Q is aluminum or iron, $x$ is an integer at least equal to 1, and $y$ is an integer at least equal to 2.

---

This invention relates to methods of distilling metal chlorides and to a class of complex chlorides constituting intermediates in such distillaton.

In various ore-treating and like operations it is necessary or desirable to effect separation of metal chlorides from materials such as ores. By way of example, certain procedures for recovering metals from ores bearing their oxides or sulfides include the steps of chlorinating the ores to convert the contained compounds to chlorides, and extracting and concentrating the chlorides, e.g., for further treatment in accordance with well-known methods to obtain the elemental metals; the purified and concentrated chlorides, which are valuable chemicals of commerce, may themselves be the end product of such procedures. Again, procedures of the foregoing type may be employed to purify materials contaminated with undesired metal oxides or sulfides, i.e., by effecting removal of the contaminant compounds.

Satisfactory extraction of metal chlorides in these and other operations has heretofore been difficult to achieve. Removal of the chlorides may be accomplished by aqueous leaching, but such leaching involves the inconvenience of washing and filtering large quantities of chlorinated ore. Alternatively, the chlorides may be distilled; but distillation of chlorides from ores by conventional methods requires the provision of undesirably high temperature conditions, since substantial volatilization of the chlorides ordinarily occurs only at temperatures approaching or above their characteristically high boiling points.

The present invention in a general sense provides a method of distilling metal chlorides (e.g., from materials containing such chlorides even in very small quantities) at temperatures markedly lower than their boiling points, and affords recovery of the distilled chlorides in condensed, pure, anhydrous form suitable for use or further treatment as desired. Thus it enables simple and operationally convenient extraction of chlorides, for example in procedures of the character mentioned above.

The invention broadly embraces the discovery that certain metal chlorides can be distilled or volatilized at temperatures far below their normal boiling points when exposed to gaseous aluminum chloride ($AlCl_3$) or gaseous ferric chloride ($FeCl_3$). Chlorides which can be thus distilled include divalent metal chlorides generally, e.g., the dichlorides of cadmium, calcium, cobalt, lead, magnesium, manganese, nickel and zinc. It is specifically found that these chlorides are very effectively distilled in the presence of aluminum chloride gas or ferric chloride gas at temperatures in a range of between about 400° C. and about 700° C. (and also higher, e.g., up to about 900° C., in the case of distillation with ferric chloride gas), whereas the normal boiling points of the particular chlorides mentioned above (except for zinc chloride, which boils at about 732° C.) range from about 950° C. for lead chloride to about 2000° C. for calcium chloride.

Accordingly, in an exemplary embodiment of the present method a body of material containing a divalent metal chloride (in solid or liquid state) to be distilled is heated to a temperature of between about 400° C. and about 700° C. while exposed to a flow of gaseous aluminum chloride or ferric chloride. Preferably the body of material, if a solid, is in finely divided form to ensure thorough exposure of the contained divalent chloride to the gas. The divalent metal chloride is volatilized in the gas flow and is carried therein (as a gas) to a condensing locality wherein the divalent and the trivalent (aluminum or ferric) chlorides are separated by fractional condensation, or by condensation followed by fractional re-distillation, or by other convenient procedure. In such manner the divalent chloride is extracted from the body of material in which it is supplied, and is recovered at the condensing locality in pure, anhydrous, concentrated form.

It is further and particularly found that the distillation or volatilization of the divalent chloride, in the method of the present invention, is effected by reaction of the divalent chloride with the gaseous trivalent (aluminum or ferric) chloride to form one or more gaseous complex chlorides each having a molecular structure constituted of one or more molecules of the divalent chloride and two or more molecules of the trivalent chloride. The general formula for these reactions is believed to be $$xMCl_2 + yQCl_3 = M_xQ_yCl_{(2x+3y)}$$

wherein

M is the divalent metal in the dichloride;
Q is trivalent aluminum or iron;
$x$ is an integer equal to or greater than one; and
$y$ is an integer equal to or greater than two.

When the trivalent gas employed is aluminum chloride, volatilization of the divalent chloride is effected by reaction to form a complex which is presently believed to contain two molecules of aluminum chloride to one molecule of divalent chloride and it is further believed that this reaction proceeds in accordance with the equation $$MCl_2 + 2AlCl_3 = MAl_2Cl_8 \qquad (2)$$

At least some divalent chlorides also react with aluminum chloride to form a second complex species apparently containing three molecules of aluminum chloride; this second reaction (which also contributes to the volatilization of the dichloride) is presently believed to be $$3MCl_2 + 3AlCl_3 = M_3Al_3Cl_{15} \qquad (3)$$

In the case of ferric chloride, volatilization of the divalent chloride apparently involves a single reaction forming a complex containing two molecules of ferric chloride to one of divalent chloride, in accordance with the equation $$MCl_2 + 2FeCl_3 = MFe_2Cl_8 \qquad (4)$$

The complex chlorides thereby produced constitute the gaseous or volatilized form of the divalent metal chlorides in the present distillation method; i.e., they are intermediates in such methods, providing the divalent chlorides in gaseous state at the low distilling temperatures of the invention and being readily dissociable (as by fractional condensation or other fractionating procedure) to yield the latter chlorides in pure, anhydrous, concentrated form. Thus in the exemplary procedure described above, the divalent chloride (as volatilized and carried in the gas flow) is combined with trivalent chloride in one or more of such complexes and is recovered therefrom at the condensing locality.

Further properties and characteristics of the present complex chlorides appear from a consideration of the equilibrium constants for their formation, as determined by the procedures described in the specific examples hereinbelow set forth. The equilibrium constants of the reactions (2) and (4) above are respectively defined by the relations $$K_{MAl_2Cl_8} = \frac{p_{MAl_2Cl_8}}{p^2_{AlCl_3}} \quad (5)$$

and $$K_{MFe_2Cl_8} = \frac{p_{MFe_2Cl_8}}{p^2_{FeCl_3}} \quad (6)$$

(wherein each factor $p$ represents partial pressure of the gas indciated by its subscript) assuming in each case that the activity of the divalent chloride $MCl_2$ is unity. Experimentally determined values of these equilibrium constants for the formation of the identified complex species at a reaction temperature of 500° C. with particular divalent metal chlorides are indicated in the following table, together with the boiling points of the divalent chlorides:

| Divalent Chloride | $K_{MAl_2Cl_8}$ (mm.$^{-1}$) | $K_{MFe_2Cl_8}$ (mm.$^{-1}$) | $\frac{K_{MFe_2Cl_8}}{K_{MAl_2Cl_8}}$ | B. P.t. of Divalent Chloride, ° C. |
|---|---|---|---|---|
| $MgCl_2$ | 13×10$^{-4}$ | | | 1,418 |
| $CaCl_2$ | 3.2×10$^{-4}$ | | | ~2,000 |
| $MnCl_2$ | 10×10$^{-4}$ | 76×10$^{-4}$ | 7.6 | 1,231 |
| $CoCl_2$ | 15×10$^{-4}$ | 105×10$^{-4}$ | 7.0 | 1,025 |
| $NiCl_2$ | 2.4×10$^{-4}$ | 20×10$^{-4}$ | 8.3 | 970 |
| $CdCl_2$ | | 110×10$^{-4}$ | | 970 |

Referring to the above table, it will be noted that for five divalent chlorides, with boiling points varying over a range of about 1,000° C., the equilibrium constants for forming $MAl_2Cl_8$ differ by less than a factor of 7; for four divalent chlorides the equilibrium constants for forming $MFe_2Cl_8$ differ by a like amount. In particular, the equilibrium constants do not exhibit dependence on the boiling points of the divalent chlorides. Since the boiling point of a divalent chloride is a measure of the difficulty of extracting a molecule from the crystal lattice and this obviously varies greatly from nickel or cadmium chloride to calcium chloride, the conclusion can be drawn that the binding of the metal ion in the complex must be very similar to that in the solid lattice; otherwise the stability of the complexes would parallel the vapor pressures of their respective constituent divalent chlorides. It will also be noted that in the case of the three divalent chlorides for which the equilibrium constants for the formation of both the aluminum and ferric complexes have been determined, the stabilities of the $MFe_2Cl_8$ and $MAl_2Cl_8$ complxse are very nearly parallel, as shown by the constant (±10%) ratio of their equilibrium constants; this again indicates that the binding in the two sets of complexes (i.e., aluminum and ferric) is the same.

It has further been determined that the heats of formation of the various aluminum and ferric complexes are substantially identical. For the aluminum chloride complexes the average heat of formation $\Delta H$ is $-16,750 \pm 520$ cal. (standard error); for the ferric chloride complexes the average vlaue of $\Delta H$ is $-17,400 \pm 780$ cal. The entropies of formation of the aluminum and ferric chloride compelxes, however, differ significantly, being $-23.3 \pm 1.5$ cal./degree for the aluminum chloride complexes and $-19.7 \pm 1.9$ cal./degree for the ferric chloride complexes. The difference of 3.6 cal./degree corresponds to the value R ln 6. This factor of 6 is close to the ratio of the equilibrium constants given in the table above, and indicates that the differences in stability between the aluminum and ferric chloride complexes are due to differences in entropy.

As previously stated, the present method provides effective distillation of divalent metal chlorides, i.e., through the formation of the complexes described above, at temperatures in a range between about 400° C. and about 700° C. (or higher, e.g., up to about 900° C., in the case of ferric chloride gas); while the latter values represent a preferred or practical range of operating temperatures, significant distillation in accordance with the present invention occurs at temperatures both above and below this range. However, an especially advantageous and preferred range of operating temperatures for distillation of divalent chlorides with aluminum chloride gas is that between about 550° C. and about 700° C. (temperatures in this range above 600° C. being particularly preferred for attainment of good reaction rates), and a specially preferred temperature range for distillation of divalent chlorides with ferric chloride is that between about 600° C. and about 900° C., it having been found that the highest molar ratios of divalent metal to trivalent metal (aluminum or iron) in the condensed distillate (i.e., including both the distilled divalent chloride and unreacted trivalent chloride) are attained with distillations at temperatures within these respective ranges. The molar ratios referred to, as will be understood, are a measure of the efficiency of the distilling operation in that they indicate the number of moles of divalent chloride distilled per mole of supplied trivalent chloride gas.

The attainment of superior M/Al and M/Fe mole ratios with distilling temperatures in the foregoing especially preferred ranges is believed to be related to the fact that both aluminum chloride and ferric chloride dimerize in gaseous state, i.e., form the complexes $Al_2Cl_6$ and $Fe_2Cl_6$, respectively, and that the trivalent chloride atmosphere, in which the divalent chloride is distilled, therefore has a content of trivalent chloride dimer. The heat of dimerization of the trichloride gas is larger than the heat of formation of the gaseous complex chlorides referred to above from monomeric trivalent chloride gas. This means that, while for the reaction $$MCl_2 \text{ (solid)} + 2QCl_3 \text{ (gas)} = MQ_2Cl_8 \text{ (gas)} \quad (7)$$

$\Delta H$ is negative, for the reaction $$MCl_2 \text{ (solid)} + Q_2Cl_6 \text{ (gas)} = MQ_2Cl_8 \text{ (gas)} \quad (8)$$

$\Delta H$ is positive. The equilibrium constant for the reaction (7) thus decreases as the distillation temperature increases, while that for reaction (8) decreases as the temperature decreases, and the partial pressure of the complex chlorides $MQ_2Cl_8$ passes through a maximum at about the temperature at which the dimer $Q_2Cl_6$ dissociates. Although the temperature at which this maximum is achieved varies to some extent depending upon the particular chlorides involved and the operating conditions (especially pressure) employed, such maximum generally occurs at temperatures in the aforementioned preferred ranges.

It is further found that although, as indicated in the table above, the equilibrium constant for the formation of the ferric chloride complex of a particular divalent chloride is higher than that for the formation of the corresponding aluminum chloride complex, indicating greater stability of the ferric chloride complex, the maximum molar ratios of divalent metals to trivalent metals attainable under optimum temperature conditions are higher for aluminum chloride than for ferric chloride; i.e., aluminum chloride is a more efficient distilling agent. This is believed to be due to the fact that the aluminum chloride dimer dissociates to a greater degree than the ferric chloride dimer, so that the vapor pressure of monomeric aluminum chloride is higher than that of monomeric ferric chloride, and also in part to the fact that aluminum chloride forms more than one complex species with at least some divalent chlorides (as indicated in Equation 3 above) whereas ferric chloride apparently forms a single complex.

In addition, it is found that the distilling efficiency of the aluminum chloride (as measured by the molar ratio $M/_{Al}$) can be enhanced by performing the distillation at superatmospheric pressures (e.g., as high as 2 atm., or above) apparently in part because the formation of the second complex species (represented by Equation 3) is promoted at such high pressures. In the case of distillation with ferric chloride, however, increase in operating pressure above 1 atm. does not appear to effect as great improvement in distilling efficiency, although some increase in efficiency is observed.

While the method of the invention has been described above as used for the distillation of a single divalent metal chloride (e.g., contained in a bulk of inert material), it is also possible to effect simultaneous distillation of two or more such divalent chlorides from a body of material containing the several chlorides thus to be distilled. In the latter case, the distillation procedure is as described above, except that one or more complex chloride species are formed with each of the divalent chlorides present. The gas delivered to the condensing locality (referring once more to the exemplary procedure described above) accordingly contains complexes for each of the two or more divalent metal chlorides distilled. These chlorides may be separated individually from the gas by appropriate fractional distillation or other fractionating procedure enabling the isolation and recovery of each in pure anhydrous form.

Further features and advantages of the invention will be apparent from the specific examples of distillation of divalent chlorides hereinbelow set forth (wherein all values of pressure are expressed in millimeters of mercury), together with the accompanying drawings, wherein.

Figure 3:
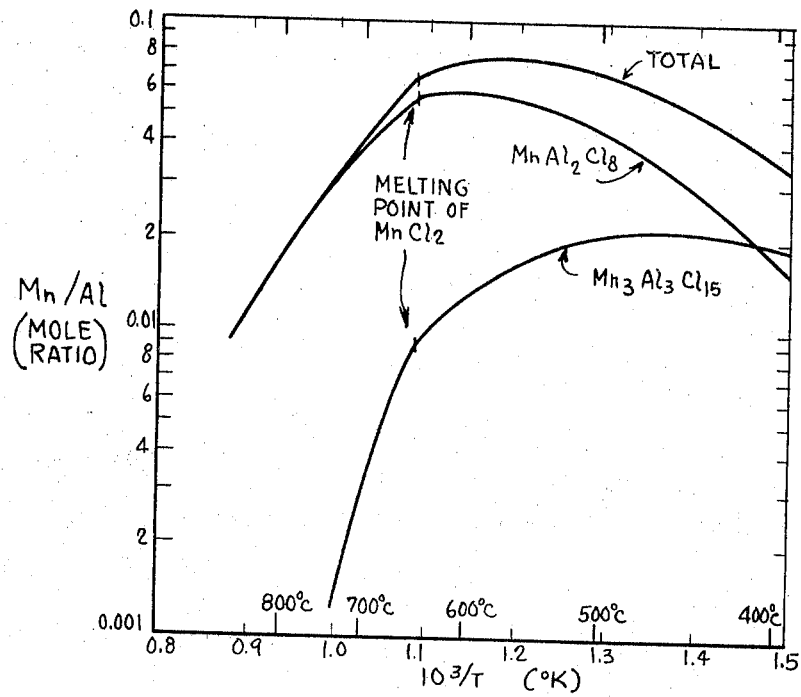
Figure 4:
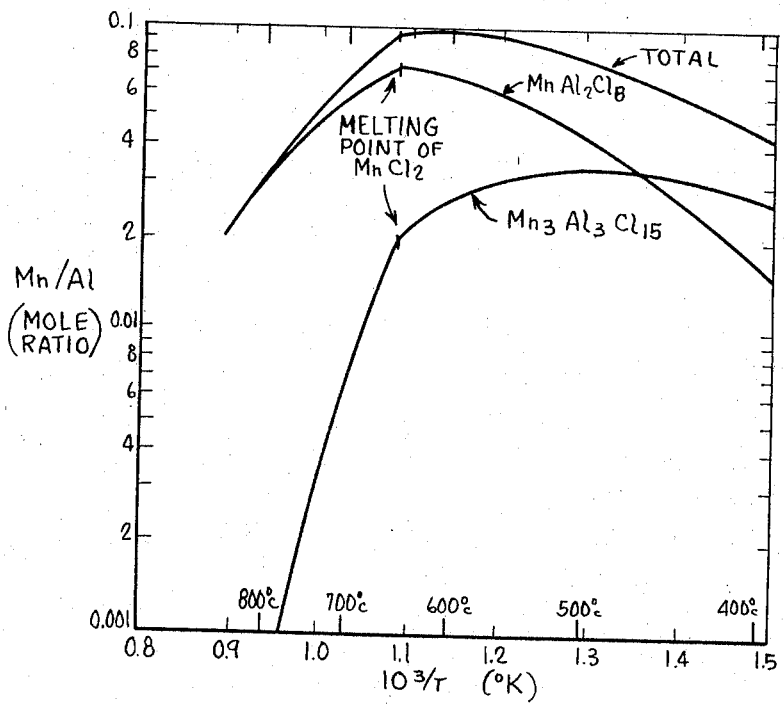

are plotted against reciprocal absolute temperature;

FIG. 3 is a graph on which molar ratios of manganese to aluminum in the aluminum chloride distillation of manganous chloride are plotted logarithmically against reciprocal absolute temperature for distillations at a total pressure of 1 atm.;

FIG. 4 is a graph on which the latter molar ratios are plotted in the same manner against reciprocal absolute temperature for distillations at a total pressure of 2 atm.;

FIG. 5 is a graph on which equilibrium constants for the formation of complex chlorides of the type 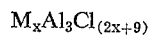 are plotted logarithmically against reciprocal absolute temperature; and FIG. 6 is a graph on which molar ratios of manganese to iron in the ferric chloride distillation of manganous chloride are plotted logarithmically against reciprocal absolute temperature.

EXAMPLE I

Anhydrous manganous chloride ($MnCl_2$) was prepared by heating Fisher "certified" grade $MnCl_2 \cdot 4H_2O$ in a Pyrex test tube in mixture with an excess of ammonium chloride, which served to repress hydrolysis. The temperature was elevated until the ammonium chloride sublimed and the remaining manganous chloride melted to a clear red liquid. On freezing, a small additional quantity of ammonium chloride was expelled as vapor, as shown by an apparent increase in the volume of the $MnCl_2$. When the latter was remelted and allowed to solidify again, a contraction in volume was observed indicating that all the ammonium chloride had been driven off.

Distillation of the manganous chloride in accordance with the present invention was then carried forward in a horizontal length of 9 mm. diameter Pyrex glass tubing having a downwardly extending U-shaped bend at a short distance from one end and a further elongated horizontal extension beyond the bend. A sample of the anhydrous manganous chloride prepared as above, in a particle size range of about $-5 +10$ mesh on the Tyler scale (the standard U.S. scale), was introduced through the short end of the tube and was positioned in the lowermost portion of the U-shaped bend. After water vapor was expelled from the tube by heating while passing argon gas through the tube from the long end of the tube, a quantity of distilled aluminum chloride powder was placed in the short end of the tube immediately ahead of the U-shaped bend and the short end of the tube was sealed, the long end remaining open.

The U-shaped bend of the tube (containing the manganous chloride) was heated in a furnace which maintained this portion of the tube at a constant temperature of 400° C. during the distillation operation, and the aluminum chloride in the short end of the tube was sublimed by application of heat, generating aluminum chloride gas which advanced along the tube and through the U-shaped bend where it came into contact with the solid manganous chloride. The manganous chloride was distilled into the flow of aluminum chloride gas, i.e., through formation of gaseous complex chlorides, and carried with the flow of aluminum chloride gas to the unheated portion of the tube (downstream of the U-shaped bend) where all the gas, including both unreacted aluminum chloride and the chloride complexes, condensed.

After completion of this distillation operation, the downstream portion of the tube containing the condensate was severed and the condensate was fractionated in a slow stream of argon gas whereby the aluminum chloride and manganous chloride constituents of the condensate were separated; the aluminum chloride, being volatile, was carried further along the tube than the manganous chloride, so that the two chlorides finally condensed at separate localities. In this fractionating operation, the argon was passed slowly through the tube while the tube was heated with a gas burner, the heating being controlled to heat the distillate just sufficiently to drive off the aluminum chloride (which sublimes at 181° C.) from the distillate. The portion of the tube containing the aluminum chloride was then severed from the portion containing manganous chloride; each portion was weighed, washed out (to remove the chloride), dried and reweighed, to determine the relative proportions by weight of aluminum chloride and manganous chloride in the condensate. From this the molar ratio of manganese to aluminum (Mn/Al) in the gas flow leaving the distillation region (i.e., the U-shaped bend) was determined.

In the foregoing procedure, the total pressure in the U-shaped bend was 1 atm. Since the long end of the tube remained open; thus the tube pressure was determined by measuring atmospheric pressure with a barometer. The procedure was repeated, again at a distillation temperature of 400° C., for other pressures both below and above atmospheric, such nonatmospheric pressures being provided by connecting the long end of the tube to a water pump (to reduce the pressure in the tube) or to a source of argon gas (to increase the pressure in the tube), the pressure in each case being measured with a mercury manometer. A second series of runs was made, again under varying conditions of total pressure, at a distillation temperature of 500° C.; and a third series of runs was made at a distillation temperature of 600° C. The manganous chloride in the U-shaped bend of the tube was in solid state at all of these distillation temperatures. The results of each of these runs are set forth in the following table, wherein the temperature and total pressure ($p_{total}$) in the tube and molar ratio of manganese to aluminum in the produced concentrate are given as determined experimentally, together with calculated values of partial pressure of aluminum chloride and of the complex chlorides formed, and also the ratio of the latter partial pressure to the square of the former:

| Temp. (° C) | $p_{total}$ | Mn/Al | $p_{AlCl_3}$ | $p'_{MnAl_2Cl_8}$ | $p'_{MnAl_2Cl_8}/p^2_{AlCl_3}$ |
| --- | --- | --- | --- | --- | --- |
| 400 | 745 | 0.0360 | 70.9 | 51.1 | 102×10⁻⁴ |
| 400 | 745 | 0.0360 | 70.9 | 51.1 | 102 |
| 400 | 1,465 | 0.0428 | 100.2 | 121.1 | 121 |
| 400 | 344 | 0.0291 | 47.4 | 18.6 | 83 |
| 400 | 199 | 0.0253 | 35.3 | 9.2 | 74 |
| 500 | 753 | 0.0605 | 232 | 77.1 | 14.3×10⁻⁴ |
| 500 | 753 | 0.0590 | 232 | 75.1 | 13.9 |
| 500 | 1,172 | 0.0698 | 298 | 143 | 16.1 |
| 500 | 1,472 | 0.0765 | 337 | 199 | 17.6 |
| 500 | 352 | 0.0494 | 147 | 27.6 | 12.8 |
| 500 | 199 | 0.0429 | 101 | 12.7 | 21.4 |
| 600 | 758 | 0.0818 | 454 | 86.9 | 4.22×10⁻⁴ |
| 600 | 758 | 0.0822 | 454 | 87.3 | 4.24 |
| 600 | 348 | 0.0592 | 254 | 26.2 | 4.06 |
| 600 | 197 | 0.0459 | 159 | 10.8 | 4.24 |
| 600 | 1,168 | 0.0970 | 609 | 168 | 4.51 |
| 600 | 1,484 | 0.110 | 707 | 249 | 4.97 |

With the above data, equilibrium constants for the formation of complex chloride species in the manganous chloride distillation were calculated. Since the manganous chloride was in solid state at all distillation temperatures used, and thus had an activity of unity, the equilibrium constant $K_{MnAl_2Cl_8}$ for the formation of the complex species $MnAl_2Cl_8$ in accordance with reaction (2) above was defined by the relation $$K_{MnAl_2Cl_8}=\frac{p_{MnAl_2Cl_8}}{p^2_{AlCl_3}} \quad (9)$$

wherein $p_{MnAl_2Cl_8}$ was the actual partial pressure of the complex species $MnAl_2Cl_8$.

To determine the equilibrium constant, the partial-pressure values and ratios given in the foregoing table were first calculated, from the determined values of total pressure, temperature, and Mn/Al ratio in the condensate, for each distillation run. The total pressure in the system $P_{total}$ was related to the partial pressures by the equation $$P_{total}=p_{AlCl_3}+p_{Al_2Cl_6}+p'_{MnAl_2Cl_8} \quad (10)$$

wherein $p_{AlCl_3}$ was partial pressure of monomeric aluminum chloride gas; $p_{Al_2Cl_6}$ was the partial pressure of aluminum chloride dimer present in the aluminum chloride atmosphere; and $p'_{MnAl_2Cl_8}$ represented the partial pressure of complex chloride formed in the distillation on the assumption that the only complex species formed was $MnAl_2Cl_8$. With this preliminary assumption made, the partial pressures were related to the molar ratio Mn/Al by the equation $$\frac{Mn}{Al}=\frac{p'_{MnAl_2Cl_8}}{p_{AlCl_3}+2p_{Al_2Cl_6}+2p'_{MnAl_2Cl_8}} \quad (11)$$

In calculating the values of partial pressure for each distillation run, a trial value of $p_{AlCl_3}$ was selected; $p_{Al_2Cl_6}$ was then computed from the equation for the dimerization equilibrium constant, viz.

$$\log\left(\frac{p^2_{AlCl_3}}{p_{Al_2Cl_6}}\right)=\frac{-6749}{T}-2.013\log T+16.628 \quad (12)$$

wherein T was absolute temperature (° K.); and $p'_{MnAl_2Cl_8}$ was obtained from these values and the known total pressure, using Equation 10. The partial-pressure values thus obtained were then inserted in Equation 11 to determine their correctness by comparison with the known molar ratio Mn/Al. After the partial-pressure values were established, the ratio $$p'_{MnAl_2Cl_8}/p^2_{AlCl_3} \quad (13)$$

was calculated for each run. Log $p'_{MnAl_2Cl_8}$ was then plotted on a graph against log $p_{AlCl_3}$ for each given distillation temperature.

If the only complex species formed were $MnAl_2Cl_8$, the ratio (13) would be a true equilibrium constant, i.e., the constant given by Equation 9 for reaction (2) above, and for any given distillation temperature a plot of log $p'_{MnAl_2Cl_8}$ against log $p_{AlCl_3}$ should be a straight line having a slope of 2. It was found, however, that the line was curved with a slope between 2 and 3, indicating the formation of a second complex species incorporating more than two molecules of $AlCl_3$. Thus, assuming a total of two species formed, the actual total partial pressure $P_a$ of the complexes was $$P_a=p_{MnAl_2Cl_8}+p_2 \quad (14)$$

i.e., the total partial pressure of the two complex species equalled the actual partial pressure of the species $MnAl_2Cl_8$ plus the actual partial pressure $p_2$ of the second species.

The true equilibrium constant $K_{MnAl_2Cl_8}$ (herein designated $K_1$) for the formation of the species $MnAl_2Cl_8$ is defined by Equation 9 above.

If the second complex formed contains $nAlCl_3$ groups, $K_1$ may be related to the aforementioned value $p'_{MnAl_2Cl_8}$ by the expression $$p'_{MnAl_2Cl_8}=K_1 p^2_{AlCl_3}+K_2 p^n_{AlCl_3} \quad (15)$$

wherein $K_2$ is a second constant related to the formation of the second species. From (15), $$\frac{p'_{MnAl_2Cl_8}}{p^2_{AlCl_3}}=K_1+K_2 p^{(n-2)}_{AlCl_3} \quad (16)$$

The ratio on the left-hand side of Equation 16 which had been calculated for each test run (as set forth in the above table), was then plotted as a function of $p_{AlCl_3}$ with a separate curve prepared for each of the three distillation temperatures. It was found that the slope of each of these curves (within the limits of accuracy of the experimental data) was linear, implying that $n-2=1$ or $n=3$, i.e., that the second complex species incorporated three $AlCl_3$ molecules. It is presently believed that this species is as given in Equation 3 above.

Figure 2:
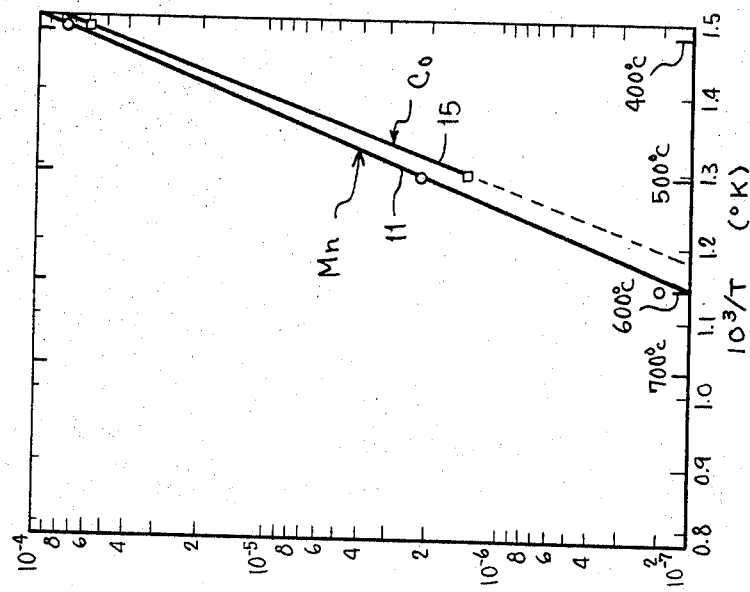
FIG. 2 is a graph on which values of a second constant determined for distillation operations involving the formation of a second complex species of the type $$M_xAl_3Cl_{(2x+9)}$$
Figure 1:
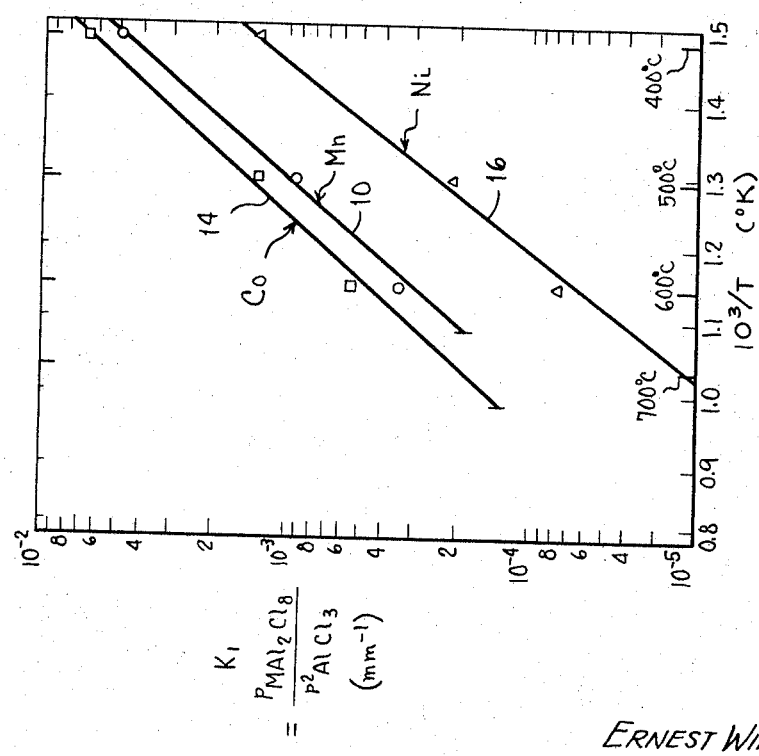
FIG. 1 is a graph on which equilibrium constants for the formation of complex chlorides of the type $MAl_2Cl_8$ are plotted logarithmically against reciprocal absolute temperature.

The slopes and origins of the last-mentioned curves gave values for $K_1$ and $K_2$ at each of the temperatures; these constants, blotted logarithmically in FIGS. 1 and 2 against reciprocal absolute temperature and designated 10 and 11, respectively, are found to be defined (as functions of absolute temperature T) by the equations $$\log K_1=\frac{3534}{T}-7.570 \quad (17)$$

and $$\log K_2=\frac{7874}{T}-15.819 \quad (18)$$

To determine the relation between temperature, pressure and molar ratio Mn/Al in the aluminum chloride distillation of manganous chloride, a series of logarithmic plots of the calculated value of Mn/Al against reciprocal absolute temperature were prepared. FIG. 3 shows the curves for a total pressure of 1 atmosphere, and FIG. 4 for a total pressure of 2 atmospheres, of the total Mn/Al ratio; the partial molar ratio due to formation of the complex $MnAl_2Cl_8$; and the partial molar ratio due to formation of the second complex species (herein provisionally designated $Mn_3Al_3Cl_{15}$). The partial and total molar ratios were calculated from the constants $K_1$ and $K_2$, as will be readily apparent. As appears from FIG. 3, the maximum total Mn/Al ratio of 0.075 is reached at about 585° C. at a total pressure of 1 atmosphere; above the melting point of manganous chloride (650° C.) the distillation falls off rapidly. At a total pressure of 2 atmospheres, as shown in FIG. 4, the maximum total Mn/Al ratio is higher (0.098) and occurs at a higher temperature (about 610° C.). Since the molar ratio Mn/Al is a measure of efficiency of distillation, in terms of moles of $MnCl_2$ distilled per mole of $AlCl_3$ supplied, it appears that superior distilling efficiency is attained with distillation at the superatmospheric pressure (2 atm.) and at the last-mentioned temperature.

EXAMPLE II

Anhydrous cobalt chloride ($CoCl_2$) was prepared from Baker "Analyzed" $CoCl_2 \cdot 6H_2O$ following the procedure described in the first paragraph of Example 1 above for the preparation of anhydrous manganous chloride.

Samples of the anhydrous cobalt chloride were distilled with aluminum chloride following the distillation procedure described in Example 1, including the step of separating the condensed gas to determine the molar ratio, in this case of cobalt to aluminum, in the product. The procedure was repeated with successive samples of anhydrous chloride under various conditions of pressure, at distillation temperatures ranging from 400° C. to 600° C. The cobalt chloride supplied for distillation was in solid state in all these temperatures.

The data thus obtained, including partial pressures of aluminum chloride gas and complex chlorides in the distillation system (and the ratios of the latter partial pressure to the square of the former) calculated in the manner described above in Example 1, are set forth in the following table:

| Temp. | $p_{total}$ | Co/Al | $p_{AlCl_3}$ | $p'_{CoAl_2Cl_8}$ | $p'_{CoAl_2Cl_8}/p^2_{AlCl_3}$ |
|---|---|---|---|---|---|
| 400 | 753 | 0.0400 | 71.0 | 57.4 | 114×10⁻⁴ |
| 400 | 750 | 0.0388 | 70.9 | 55.5 | 110 |
| 400 | 195 | 0.0288 | 34.8 | 10.2 | 84.5 |
| 400 | 351 | 0.0354 | 47.6 | 23.2 | 102 |
| 400 | 1,464 | 0.0442 | 100.0 | 125 | 125 |
| 400 | 197 | 0.0296 | 35.0 | 10.6 | 87.2 |
| 400 | 1,474 | 0.0409 | 100.7 | 116 | 115 |
| 500 | 750 | 0.0717 | 228 | 91.2 | 17.5×10⁻⁴ |
| 500 | 755 | 0.0715 | 229 | 91.6 | 17.4 |
| 500 | 1,473 | 0.0784 | 335 | 210 | 18.7 |
| 500 | 1,170 | 0.0804 | 294 | 159 | 18.3 |
| 500 | 352 | 0.0602 | 145 | 33.7 | 16.0 |
| 600 | 755 | 0.1055 | 439 | 113 | 5.87×10⁻⁴ |
| 600 | 755 | 0.1038 | 440 | 111 | 5.74 |
| 600 | 354 | 0.0828 | 250 | 37.9 | 6.06 |
| 600 | 196 | 0.0679 | 155 | 16.1 | 6.74 |
| 600 | 1,167 | 0.123 | 587 | 216 | 6.26 |
| 600 | 1,472 | 0.127 | 687 | 287 | 6.07 |

Equilibrium constants for the formation of the aluminum chloride-cobalt chloride complexes produced in the distilling operation were determined in the manner set forth in connection with Example I. It was again found that a second complex species was formed (in addition to $CoAl_2Cl_8$) and that the second species incorporated three molecules of $AlCl_3$. From a plot of $$p'_{CoAl_2Cl_8}/p^2_{AlCl_3}$$

against $p_{AlCl_3}$ for each of the three distillation temperatures employed the values of the true equilibrium constant for formation of the complex $CoAl_2Cl_8$ and of the second constant $K_2$ at each temperature were obtained.

The latter constants are plotted logarithmically against reciprocal absolute temperatures in FIGS. 1 and 2, the curves being designated 14 and 15, respectively; the values of these constants as functions of absolute temperature T are found to be expressed by the relations $$\log K_1 = \frac{3448}{T} - 7.276 \quad (19)$$

and $$\log K_2 = \frac{8403}{T} - 16.714 \quad (20)$$

In determining the relation (20) for $K_2$, the value of $K_2$ at 600° C. was extrapolated because the slope of the curve of $$p'_{CoAl_2Cl_8}/p^2_{AlCl_3}$$

against $p_{AlCl_3}$ at 600° C. was not statistically different from 0; the extrapolated value was then used to derive $K_1$.

EXAMPLE III

Anhydrous nickel chloride ($NiCl_2$) was prepared by heating Baker "analyzed" $NiCl_2 \cdot 6H_2O$. Successive samples of this nickel chloride were then distilled with aluminum chloride by the procedure set forth in Example I, at various pressures and at temperatures of 400° C., 500° C. and 600° C.; the nickel chloride was in solid state at all these temperatures. Molar ratios of nickel to aluminum in the condensate were determined as before. The resultant data, together with partial pressures of aluminum chloride and complex chlorides in the distillation system (calculated as before), and also the ratio $$p'_{NiAl_2Cl_8}/p^2_{AlCl_3}$$

for each experimental run, are set forth in the following table:

| Temp. (°C.) | $p_{total}$ | Ni/Al | $p_{AlCl_3}$ | $p'_{NiAl_2Cl_8}$ | $p'_{NiAl_2Cl_8}/p^2_{AlCl_3}$ |
|---|---|---|---|---|---|
| 400 | 755 | 0.0036 | 73.9 | 5.15 | 9.42×10⁻⁴ |
| 400 | 755 | 0.0053 | 73.7 | 7.62 | 14.0 |
| 400 | 1,466 | 0.0066 | 104 | 18.7 | 17.2 |
| 500 | 755 | 0.0107 | 245 | 13.6 | 2.25×10⁻⁴ |
| 500 | 755 | 0.0117 | 245 | 14.8 | 2.47 |
| 500 | 1,474 | 0.0116 | 362 | 30.0 | 2.29 |
| 500 | 354 | 0.0087 | 154 | 4.82 | 2.04 |
| 500 | 1,167 | 0.0107 | 317 | 21.5 | 2.14 |
| 600 | 755 | 0.0144 | 489 | 14.7 | 0.615×10⁻⁴ |
| 600 | 755 | 0.0163 | 488 | 16.6 | 0.699 |
| 600 | 1,479 | 0.0241 | 782 | 52.5 | 0.859 |
| 600 | 1,174 | 0.0197 | 669 | 33.1 | 0.739 |
| 600 | 207 | 0.0227 | 171 | 5.52 | 1.89 |
| 600 | 363 | 0.0193 | 275 | 8.69 | 1.15 |

The nickel chloride was observed to distill to a markedly less extent than the manganous and cobalt chlorides of Examples I and II, and there was no indication of increase in the apparent equilibrium constant $$p'_{NiAl_2Cl_8}/p^2_{AlCl_3}$$

with pressure. Specifically, when $\log p'_{NiAl_2Cl_8}$ was plotted against $\log p_{AlCl_3}$ the slope of the curve for a given distillation temperature was found to be equal to 2, thus indicating that a single complex species was formed (viz. $NiAl_2Cl_8$) and that the apparent equilibrium constant referred to above is in fact a true equilibrium constant for the formation of this complex species.

The latter constant (i.e., the constant $K_1$, for nickel chloride) is plotted logarithmically against reciprocal absolute temperature in FIG. 1 (curve 16), and is found to be expressed, as a function of absolute temperature, by the equation $$\log K_1 = \frac{3972}{T} - 8.766 \quad (21)$$

EXAMPLE IV

Anhydrous lead chloride ($PbCl_2$) was prepared by recrystallizing Baker "analyzed" material from boiling water. Since lead chloride forms a liquid phase with aluminum chloride at the distillation temperatures herein contemplated, it was distilled with aluminum chloride from the liquid state. For this purpose, the lead chloride was placed in a sealed Pyrex vessel, which communicated with an outlet tube of Pyrex at a locality above the level of the melt. Aluminum chloride gas was supplied through a tube extending into the vessel and below the level of the melt (so that the aluminum chloride gas bubbled through the melt) while the vessel was maintained at the desired distilling temperature by suitable heating means. The aluminum chloride gas passing through the melt distilled the lead chloride to form gaseous complex chloride which was carried with unreacted aluminum chloride into the outlet tube, where the gases condensed. This condensed product was fractionated as before to give the molar ratio of lead to aluminum in the gas flow leaving the distillation region.

The foregoing procedure was carried out at temperatures of 500° C. and 600° C., each at 1 atm. The results, including calculated partial pressures of aluminum chloride and complex chlorides, are indicated in the following table:

| Temp. (° C.) | $p_{total}$ | Pb/Al | $p_{AlCl_3}$ | $p'_{PbAl_2Cl_8}$ |
|---|---|---|---|---|
| 500 | 747 | 0.025 | 240 | 31 |
| 600 | 747 | 0.032 | 476 | 33 |

Since the lead chloride was in liquid phase with the aluminum chloride supplied, the activity of lead chloride was unknown and therefore the equilibrium constant or constants for the formation of the gaseous complex chloride or chlorides involved in this distillation of lead chloride could not be determined in the manner described above in Example I.

EXAMPLE V

Anhydrous zinc chloride ($ZnCl_2$) was prepared by melting Baker and Adamson's zinc chloride powder, substantial quantities of water thereby being driven off. Since zinc chloride is in liquid state (containing aluminum chloride in solution) at the distilling temperatures employed, it was distilled with aluminum chloride in accordance with the procedure set forth above in Example IV, the molar ratio Zn/Al in the condensate being determined as before. Successive runs were made at atmospheric pressure at temperatures of 400° C., 500° C. and 600° C. The results are summarized in the table set forth below:

| Temp. (° C.) | $p_{total}$ | Zn/Al |
|---|---|---|
| 400 | 744 | 0.155 |
| 500 | 751 | 0.249 |
| 500 | 751 | 0.249 |
| 600 | 753 | 0.568 |

It was observed that zinc chloride distills to a large extent in aluminum chloride. This is apparently due in part to the high vapor pressures of zinc chloride at the distillation temperatures (0.4 mm. at 400° C., 8.4 mm. at 500° C. and 81 mm. at 600° C.). However, the molar ratios Zn/Al in the condensate were substantially larger than would result from the normal vapor pressure of zinc chloride alone, demonstrating that there was substantial distillation of zinc chloride by formation of complex chloride with the aluminum chloride. Because of the high vapor pressure of zinc chloride and also because the activity of the zinc chloride was unknown (due to the fact that it formed a liquid phase with aluminum chloride) the partial pressures and equilibrium constant or constants could not be satisfactorily determined by the calculations set forth in Example I.

EXAMPLE VI

Anhydrous cadmium chloride ($CdCl_2$) was prepared by melting Baker "analyzed" cadmium chloride. The cadmium chloride was found to form a liquid phase with aluminum chloride in solution at 400° C. and 600° C. and to be in solid state in the presence of aluminum chloride gas at 1 atm. pressure at 500° C. Accordingly, cadmium chloride prepared as above was distilled with aluminum chloride at 400° C. and at 600° C. in accordance with the procedure of Example IV, and at 500° C. in accordance with the procedure of Example I, in each case at a total pressure of 1 atm. Results are summarized in the following table:

| Temp. (° C.) | $p_{total}$ | Cd/Al | $p_{AlCl_3}$ | $p'_{CdAl_2Cl_8}$ | $p'_{CdAl_2Cl_8}/p^2_{AlCl_3}$ |
|---|---|---|---|---|---|
| 400 | 749 | 0.0286 | 71.7 | 40.8 | -------- |
| 500 | 755 | 0.135 | 211 | 175 | 39.3×10⁻⁴ |
| 600 | 755 | 0.100 | 442 | 107 | -------- |

Since the activity of the cadmium chloride at 400° C. and 600° C. was unknown, the equilibrium constants for the formation of chloride complexes were not determined.

EXAMPLE VII

A sample of anhydrous manganous chloride prepared as in Example I above was distilled with ferric chloride gas at a temperature of 400° C. in accordance with the procedure set forth in Example I. The ferric chloride was Fisher "laboratory" grade anhydrous ferric chloirde, and was placed in the short end of the Pyrex tube referred in Example I, i.e., in place of the aluminum chloride powder. In determining the molar ratio of the condensate produced by this distillation procedure, the fractionating operation employed in Example I could not be used owing to loss of chlorine by reduction of part of the ferric chloride to ferrous chloride. Instead, the entire condensate was dissolved in water and the ratio of manganese to iron present was determined directly by X-ray fluorescence analysis of the dissolved condensate. The distillation procedure was repeated for operating temperatures of 500° C. and 600° C. at atmospheric and superatmospheric pressures. At all these temperatures the manganous chloride was in solid state. Two further distillation runs using ferric chloride were made at 700° C.; since the manganous chloride is in liquid state at the latter temperature, the procedure of Example IV was followed for these runs, using Vycor rather than Pyrex glass for the apparatus because of the high temperature employed. The results of the distillation of manganous chloride with ferric chloride including calculated partial pressures of ferric chloride and complex chloride and the ratio of the latter partial pressure to the square of the former, are given in the following table:

| Temp. (° C.) | $p_{total}$ | Mn/Fe | $p_{FeCl_3}$ | $p'_{MnFe_2Cl_8}$ | $p'_{MnFe_2Cl_8}/p^2_{FeCl_3}$ |
|---|---|---|---|---|---|
| 400 | 747 | 0.0043 | 11.1 | 6.4 | 520×10⁻⁴ |
| 500 | 740 | 0.0128 | 51.4 | 18.3 | 69 |
| 600 | 740 | 0.029 | 156 | 38.3 | 16 |
| 600 | 1,461 | 0.038 | 225 | 102 | 20 |
| 700 | 745 | 0.052 | 330 | 60.3 | 5.5 |
| 700 | 1,469 | 0.053 | 506 | 129 | 5.0 |

The partial pressures were calculated in the manner described above in Example I, again assuming that the complexes formed were of the type $MnFe_2Cl_8$. The partial pressure of the ferric chloride dimer, $Fe_2Cl_6$ was determined for these calculations from the equation for the dimerization equilibrium constant as a function of absolute temperature T (° K.), viz:

$$\log\left(\frac{p^2_{FeCl_3}}{p_{Fe_2Cl_6}}\right) = -\frac{7113}{T} + 9.797 \qquad (22)$$

It is expected that the values of partial pressures thus obtained, i.e., by calculation from equations analogous to those set forth in Example I, may be somewhat less accurate than in the case of distillation with aluminum chloride, because ferric chloride is not only in equilibrium with its dimer in gaseous state, but is also in equilibrium with ferrous chloride and chlorine; and it is presumed that ferrous chloride (like other dichlorides) can form a complex with ferric chloride, viz:

$$6FeCl_3 = 2Fe_3Cl_8 + Cl_2 \qquad (23)$$

The results summarized in the foregoing table indicate that complexes containing more than two $FeCl_3$ molecules do not form in significant amounts. Thus the ratio $$p'_{MnFe_2Cl_8}/p^2_{FeCl_3}$$

is the true equilibrium constant for the formation of the single complex $MnFe_2Cl_8$. This equilibrium constant is plotted logarithmically as a function of reciprocal absolute temperature in FIG. 5 (curve 18). For solid manganous chloride, i.e., distilled at temperatures below the melting point of manganous chloride (650° C.) this constant as a function of absolute temperature is found to be expressed by the relation $$\log K_{MnFe_2Cl_8} = \frac{3927}{T} - 7.202 \quad (24)$$

and for manganous chloride distilled at temperatures above the melting point the constant is given by the relation $$\log K_{MnFe_2Cl_8} = \frac{5887}{T} - 9.326 \quad (25)$$

The change in slope corresponds to the heat of fusion.

To determine the relation between pressure, temperature and molar ratio of manganese to iron in the produced gas of the distillation, calculated values of the molar ratio Mn/Fe are plotted as a function of reciprocal absolute temperature in FIG. 6, for pressures of 1 atm. (curve 19) and 2 atm. (curve 20), respectively. It will be noted from FIG. 6 that the maximum Mn/Fe ratios (corresponding to maximum distilling efficiency) are 0.052 at 680°, and 0.056 at 710°, at the two pressures. Comparing these results with those shown in FIGS. 3 and 4 for the distillation of manganous chloride with aluminum chloride, it will be noted that although the equilibrium constant for the formation of the ferric chloride complex is higher than those for the aluminum chloride complexes, aluminum chloride is a more efficient distilling agent, i.e., giving higher maximum Mn/Al ratios.

EXAMPLE VIII

Samples of cobalt chloride prepared as in Example II above were distilled with ferric chloride at temperatures of 400° C. to 700° C. in accordance with the procedure set forth in Example VII for the distillation of solid manganous chloride, cobalt chloride being in solid state at all the distilling temperatures employed. For distillations at 700° C. Vycor rather than Pyrex glass was used for the distilling apparatus to withstand the high temperature. The results of the several cobalt chloride runs, including calculated values of partial pressures and equilibrium constant, are set forth in the following table:

| Temp. (° C.) | $p_{total}$ | Co/Fe | $p_{FeCl_3}$ | $p'_{CoFe_2Cl_8}$ | $p'_{CoFe_2Cl_8}/p^2_{FeCl_3}$ |
|---|---|---|---|---|---|
| 400 | 750 | 0.0044 | 11.1 | 6.5 | 530×10⁻⁴ |
| 500 | 740 | 0.0192 | 51.0 | 27.4 | 104 |
| 600 | 736 | 0.0500 | 152 | 66 | 28.6 |
| 600 | 1,474 | 0.055 | 222 | 150 | 30 |
| 700 | 750 | 0.110 | 308 | 131 | 14 |
| 700 | 1,480 | 0.122 | 466 | 304 | 14 |

There is no indication that any complex species other than $CoFe_2Cl_8$ is formed; the equilibrium constant given in the table is thus the true equilibrium constant for the formation of the latter complex. This constant is ploted as a funcion of reciprocal absolute temperature in FIG. 5 (curve 22), and is expressed as a function of reciprocal absolute temperature by the relation $$K_{CoFe_2Cl_8} = \frac{3460}{T} - 6.463 \quad (26)$$

EXAMPLE IX

Samples of anhydrous nickel chloride prepared as in Example III above were distilled with ferric chloride gas at temperatures of 400° to 700° C. and at various total pressures, in accordance with the procedure set forth in Example VII above for the distillation of solid manganous chloride, nickel chloride being in solid state at all the distillation temperatures of the present example. The results, including partial pressures and equilibrium constants calculated as before, for each run, are given in the following table:

| Temp. (° C.) | $p_{total}$ | Ni/Fe | $p_{FeCl_3}$ | $p'_{NiFe_2Cl_8}$ | $p'_{NiFe_2Cl_8}/p^2_{FeCl_3}$ |
|---|---|---|---|---|---|
| 400 | 757 | 0.0017 | 11.2 | 2.6 | 206×10⁻⁴ |
| 500 | 757 | 0.0028 | 52.5 | 4.1 | 14.9 |
| 600 | 752 | 0.0060 | 161 | 8.1 | 3.11 |
| 600 | 1,471 | 0.013 | 232 | 35.0 | 6.52 |
| 700 | 752 | 0.023 | 343 | 26.7 | 2.28 |
| 700 | 1,471 | 0.0245 | 522 | 59.4 | 2.18 |

It is presently believed that only a single complex species is formed in this distillation, viz, $NiFe_2Cl_8$. The equilibrium constant for the formation of this species is plotted logarithmically in FIG. 5 (curve 24) against reciprocal absolute temperature, and is expressed as a function of absolute temperature by the relation $$K_{NiFe_2Cl_8} = \frac{4088}{T} - 7.888 \quad (27)$$

EXAMPLE X

Samples of anhydrous lead chloride prepared as in Example IV above were distilled with ferric chloride under various temperature conditions in accordance with the procedure set forth in Example VII for the distillation of liquid manganous chloride, lead chloride being in liquid state at the temperatures employed. The results are summarized as follows:

| Temp. (° C.) | $p_{total}$ | Pb/Fe | $p_{FeCl_3}$ | $p'_{PbFe_2Cl_8}$ |
|---|---|---|---|---|
| 400 | 754 | Nil | | |
| 500 | 751 | 0.004 | 52.2 | 6.0 |
| 600 | 747 | 0.010 | 160 | 13.3 |

It is found that lead chloride distills only to a limited extent in the presence of ferric chloride.

EXAMPLE XI

Samples of anhydrous zinc chloride prepared as in Example V above were distilled with ferric chloride under various temperature conditions in accordance with the procedure set forth in Example VII for the distillation of liquid manganous chloride, zinc chloride being in liquid state at the temperatures employed. The results are summarized in the following table:

| Temp. (° C.) | $p_{total}$ | Zn/Fe |
|---|---|---|
| 400 | 760 | 0.070 |
| 500 | 756 | 0.115 |
| 600 | 760 | 0.40 |

EXAMPLE XII

Samples of anhydrous cadmium chloride prepared as in Example VI above were distilled with ferric chloride at atmospheric pressure under various temperature conditions; at 400° and 500° C. the cadmium chloride was solid, and was accordingly distilled by the procedure set forth in Example VII above for the distillation of solid manganous chloride, whereas at 600° C. the cadmium chloride was in liquid phase and was distilled in accordance with the procedure of Example VII for the distillation of liquid manganous chloride. The results are summarized in the following table:

| Temp. (° C.) | $p_{total}$ | Cd/Fe | $p_{FeCl_3}$ | $p'_{CdFe_2Cl_8}$ | $p'_{CdFe_2Cl_8}/p^2_{FeCl_3}$ |
|---|---|---|---|---|---|
| 400 | 751 | 0.006 | 11.1 | 9 | 720×10⁻² |
| 500 | 751 | 0.020 | 51.4 | 29 | 110 |
| 600 | 755 | 0.090 | 147 | 123 | |

The equilibrium constant for the formation of the complex CdFe₂Cl₈ at 400° and 500° C., as calculated, is plotted logarithmically in FIG. 5 (broken curve 27) against reciprocal absolute temperature.

The method of the invention as described above may be employed for the distillation of divalent chlorides however produced. As previously stated, one important field of application for the present method is in the extraction, e.g., from ores, of divalent metal chlorides produced by the chlorination of metal oxides or sulfides contained in the ores. The initial conversion of the oxides or sulfides to the corresponding chlorides, in such operations, may be effected by chlorination with elemental chlorine, in accordance with the reactions.

$$2MO+2Cl_2=2MCl_2+O_2 \quad (28)$$

and $$2MS+2Cl_2=2MCl_2+S_2 \quad (29)$$

respectively. In the case of oxides for which the free energy of reaction (28) is positive the latter reaction will proceed only in the presence of a reducing agent; all the sulfides can be directly chlorinated with $Cl_2$, since the free energy for all reactions of the type (29) is negative.

However, the present invention in one specific aspect further contemplates certain particularly advantageous chlorination procedures, whereby chlorination of oxides or sulfides and distillation of the produced chlorides is effected in a substantially unitary operation. Referring first to the chlorination of oxides, it is found that the oxide, or a material such as an ore containing the oxide, may be exposed to a chlorinating atmosphere containing both elemental $Cl_2$ as a chlorinating agent and gaseous aluminum chloride or ferric chloride, at a temperature of e.g., above about 400° C. (a preferred temperature range being that from about 500° C. to about 800° or even 900° C.), to effect simultaneous chlorination of the oxide with the chlorine and distillation of the produced chloride by reaction with the trivalent chloride gas to form one or more gaseous complex chlorides, in accordance with the distilling method above described. In every case, to avoid consumption of the trivalent chloride by conversion to alumina or iron oxides, such combined chlorination and distillation is very preferably performed in the presence of carobn to reduce the oxide. The gas containing the complex chlorides may be led off for treatment by suitable fractionating procedures to recover the contained divalent metal chloride as a pure condensate.

Alternatively, and further in accordance with the invention, chlorination and distillation of a divalent metal oxide may be effected by exposing the oxide to a chlorinating atmosphere consisting essentially of gaseous alumium chloride or ferric chloride, at a temperature e.g. in the aforementioned range. Some of the trivalent gas reacts in such case with the oxide to convert the latter to divalent metal chloride, and further amounts of the trivalent chloride gas then react with the produced chloride to form gaseous chloride complexes, i.e., volatilizing the divalent chloride. These latter complexes, again, may be fractionated to recover the pure divalent chloride. When the trivalent chloride gas is used as both chlorinating and distilling agent, there is some consumption of trivalent chlorides by conversion to the corresponding oxide, but the use of the trivalent chloride for both purposes has the compensating advantage that reducing conditions are not used (and are in fact undesirable) for the chlorination.

In this connection, it may be explained that a chloride of one metal can act to chlorinate the oxide of another metal (with concomitant oxidation of the chloride), if the free energy of reaction for the chlorination of the oxide of the first-mentioned metal is higher than the free energy of reaction for the chlorination of the oxide of the second-mentioned metal. It will be understood that the term "higher free energy of reaction" is used herein with reference to the relative position of a particular free energy of reaction on a free-energy scale in which positive free energies are higher than negative free energies. The chlorination of both aluminum and ferric oxides proceeds with a substantial positive free energy of reaction, whereas the chlorination of divalent metal oxides, e.g., the divalent oxides of the metals specifically mentioned in the preceding examples, proceeds with a smaller positive or even in most cases with a substantial negative free energy of reaction. This thermodynamic consideration is believed to explain why the trivalent gaseous chlorides serve as effective chlorinating agents for the divalent oxides.

Similar procedures may be employed to effect combined or unitary chlorination and distillation in the case of divalent metal sulfides. Thus, as before, chlorination and distillation can be carried out simultaneously by exposing the sulfide (or ore or other material containing the same) to a chlorinating atmosphere including both elemental chlorine and gaseous aluminum chloride or ferric chloride, at a temperature, e.g., between about 400° C. and about 700° C. The chlorine converts the sulfide to divalent chloride, and the trivalent chloride gas distills the divalent chloride by the formation of gaseous complexes, e.g., for usbsequent fractionation as before. If the trivalent gas used is aluminum chloride the reaction proceeds according to the equation $$2MS+2Cl_2+4AlCl_3=2MAl_2Cl_8+S_2 \quad (30)$$

If an excess of chlorine is used, sulphur di-chloride $(SCl_2)$ will be formed instead of elemental sulphur. Production of the latter compound is advantageous in that sulphur dichloride is a low boiling (59° C.) nonviscous liquid which can be either fractionated out and recovered as such or recirculated so that it reacts with more sulfide. In the case of use of ferric chloride as a distilling agent in the last-mentioned procedure, provision of sufficient elemental chlorine to prevent loss of ferric chloride always results in the production of sulphur dichloride rather than elemental sulphur.

Again, divalent metal sulfides may be chlorinated (as well as distilled) with gaseous aluminum chloride or ferric chloride. In the absence of elemental chlorine, chlorination with aluminum chloride results in formation of aluminum sulfide. Chlorination with ferric chloride results in production of elemental sulphur or sulphur dichloride together with the desired divalent metal chloride, but also involves substantial loss of ferric chloride due to conversion to ferrous chloride in accordance with the reaction $$2MS+4FeCl_3=2MCl_2+4FeCl_2+S_2 \quad (31)$$

or $$MS+4FeCl_3=MCl_2+4FeCl_2+SCl_2 \quad (32)$$

By way of specific example of foregoing chlorination procedures, it has been found that galena (PbS), in a particle size of several millimeters, is very readily chlorinated by exposure to aluminum chloride gas or ferric chloride gas at a temperature of 600° C. to yield liquid lead chloride $(PbCl_2)$. With ferric chloride, if a comparatively large quantity of galena is used relative to the amount of ferric chloride present, no ferric chloride passes beyond the reaction zone and the condensate (from the effluent gas) consists solely of sulfur; the reaction involved is believed to be represented by the equation $$2PbS+4FeCl_3=2PbCl_2+4FeCl_2+S_2 \quad (33)$$

With a smaller relative proportion of galena, the condensate contains lead chloride, ferric chloride, ferrous chloride, and sulfur dichloride. It is believed that in this case, as the gas mixture cools the sulfur formed by reaction (33) reduces some of the ferric chloride:

$$S_2+4FeCl_3=4FeCl_2+2SCl_2 \quad (34)$$

When aluminum chloride is used as the chlorinating agent no significant quantities of sulfur or sulfur dichloride appear in the condensate.

In a further example of the present method, for recovery of purified divalent metal chloride from an impure sulfide, a synthetic ore was prepared by mixing 0.100 gram of crushed cobalt sulfide (containing 0.065 gram of cobalt) with 2.0 grams of crushed silica, the latter representing gangue material in the ore. This mixture, heated to 600° C., was exposed to a flow of gaseous aluminum chloride at atmospheric pressure. A distillate of $CoCl_2$ was obtained from the gas flow. Recovery of cobalt chloride by this extraction procedure, expressed as weight of cobalt in the resulting distillate, is given in the following table, wherein as will be understood values given in all three columns are cumulative:

| Wt. $AlCl_3$ (g.) | Wt. Co distilled (g.) | Recovery of Co (percent) |
|---|---|---|
| 4.42 | 0.0115 | 17.7 |
| 8.18 | 0.0243 | 37.4 |
| 10.69 | 0.0301 | 46.3 |
| 15.12 | 0.0389 | 59.8 |
| 19.79 | 0.0463 | 71.2 |
| 21.44 | 0.0464 | 71.4 |
| 26.64 | 0.0486 | 74.7 |
| 28.53 | 0.0496 | 76.3 |

A like quantity of the same synthetic cobalt ore was heated to 600° C. and exposed to a flow of gaseous ferric chloride at atmospheric pressure, a distillate of $CoCl_2$ being obtained from the gas flow. The recovery of cobalt achieved with this procedure, again expressed as weight of cobalt in the distillate, is given in the following table, wherein all values are cumulative:

| Wt. $AlCl_3$ (g.) | Wt. Co distilled (g.) | Recovery of Co (percent) |
|---|---|---|
| 2.63 | 0.0219 | 33.7 |
| 4.59 | 0.0366 | 56.3 |
| 6.67 | 0.0564 | 86.7 |
| 7.96 | 0.0605 | 93.0 |
| 9.14 | 0.0607 | 93.4 |

As will be apparent from the foregoing data, in this particular instance, the procedure using ferric chloride gas was found to be more efficient than that employing aluminum chloride.

It is to be understood that the invention is not limited to the procedures and embodiments hereinabove specifically set forth, but may be carried out in other ways without departure from its spirit.

I claim:

1. A method of extracting divalent metal chloride from material containing the same in mixture with at least one other substance, comprising
   (a) exposing said material to a gaseous trivalent chloride selected from the class consisting of aluminum chloride and ferric chloride while maintaining said divalent chloride and said gaseous trivalent chloride at a temperature of at least about 400° C. for converting said divalent chloride to gaseous material including at least one gaseous complex chloride formed by reaction of said divalent chloride with said trivalent chloride, and
   (b) physically separating said gaseous material from said material containing said one other substance.

2. A method of recovering divalent metal chloride comprising
   (a) exposing divalent metal chloride to a gaseous trivalent chloride selected from the class consisting of aluminum chloride and ferric chloride while maintaining said divalent chloride and said gaseous trivalent chloride at a temperature of at least about 400° C. for converting said divalent chloride to gaseous material including at least one gaseous complex chloride formed by reaction of said divalent chloride with said trivalent chloride, and
   (b) condensing said gaseous material for recovering said divalent chloride as a purified condensate, said condensing step effecting thermal decomposition of said one complex chloride into said divalent chloride in pure anhydrous state and said trivalent chloride.

3. A method according to claim 2, wherein said trivalent chloride is aluminum chloride and said temperature is not more than about 700° C.

4. A method according to claim 3, wherein said exposing step is performed at a pressure substantially greater than one atmosphere.

5. A method according to claim 4, wherein said pressure is about two atmospheres and said temperature is at least about 600° C.

6. A method according to claim 2, wherein said trivalent chloride is ferric chloride and said temperature is not more than about 900° C.

7. A method according to claim 2, wherein said divalent chloride is selected from the class consisting of the dichlorides of cadmium, calcium, cobalt, lead, magnesium, manganese, nickel and zinc.

8. A method according to claim 2, wherein said divalent chloride is $MgCl_2$.

9. A method according to claim 2, wherein said divalent chloride is $CaCl_2$.

10. A method according to claim 2, wherein said divalent chloride is $MnCl_2$.

11. A method according to claim 2, wherein said divalent chloride is $CoCl_2$.

12. A method according to claim 2, wherein said divalent chloride is $NiCl_2$.

13. A method according to claim 2, wherein a flow of said gaseous trivalent chloride is conducted from a first locality to a second locality, said exposing step being performed by exposing said divalent chloride to said flow at said first locality; and wherein said gaseous material is carried in said flow from said first locality to said second locality, said condensing step being performed at said second locality.

14. A method according to claim 13, wherein said condensing step comprises fractionating said flow including said gaseous material for recovering said divalent chloride in pure anhydrous state.

15. A method according to claim 2, wherein said exposing step comprises exposing material containing said divalent metal chloride in mixture with at least one other substance to said gaseous trivalent chloride.

16. A method according to claim 2, wherein said exposing step comprises exposing a divalent metal compound selected from the class consisting of divalent metal oxides and sulfides to a chlorinating atmosphere containing said selected gaseous trivalent chloride, for converting said selected compound to said divalent chloride and concomitantly converting said divalent chloride to gaseous material as aforesaid.

17. A method according to claim 16, wherein said chlorinating atmosphere contains elemental chlorine gas and said temperature is at least about 500° C.

18. A method according to claim 16, wherein said chlorinating atmosphere consists essentially of said selected trivalent chloride and said temperature is at least about 500° C.

References Cited

J. W. Mellor's "A Comprehensive Treatise on Inorganic and Theoretical Chemistry," vol. 5, 1924 edition, page 322, Longmans, Green & Co., New York publishers.

C. A. Jacobson's books, "Encyclopedia of Chemical Reactions," vol. 4, 1951 edition, page 51, and vol. 1, 1946 edition, pages 68 and 84, Reinhold Pub. Corp., New York.

EDWARD STERN, Primary Examiner.

U.S. Cl. X.R.

23—90, 91, 93, 97, 205, 224, 294